United States Patent [19]

Hook

[11] 3,913,036

[45] Oct. 14, 1975

[54] HIGH-POWER, HIGH FREQUENCY SATURABLE CORE MULTIVIBRATOR POWER SUPPLY

[75] Inventor: Glen C. Hook, Libertyville, Ill.

[73] Assignee: Victor Comptometer Corporation, Chicago, Ill.

[22] Filed: Aug. 16, 1974

[21] Appl. No.: 497,841

[52] U.S. Cl................ 331/113 A; 331/109; 331/183
[51] Int. Cl.[2]........................ H03K 1/14; H03K 3/30
[58] Field of Search................ 331/113 A, 109, 183; 321/2, 45 R

[56] References Cited

UNITED STATES PATENTS

| | | | |
|---|---|---|---|
| 3,172,060 | 3/1965 | Jensen | 331/113 A |
| 3,350,661 | 10/1967 | Bloom et al. | 331/113 A |
| 3,361,952 | 1/1968 | Bishop | 331/113 A X |
| 3,467,852 | 9/1969 | Murray et al. | 321/45 R |

*Primary Examiner*—Siegfried H. Grimm
*Attorney, Agent, or Firm*—McCaleb, Lucas & Brugman

[57] ABSTRACT

A saturable core astable multivibrator power supply circuit provides a high-power, high-frequency square wave voltage output. The circuit includes two alternately conducting high-power semiconductor switching means having significant parasitic junction capacitances, the switching means being in circuit with a saturable core feedback transformer means for providing periodically reversing feedback voltage to control alternate switching means conduction. A slow recovery diode means, having slow forward and reverse recovery time characteristics, is connected in circuit with each switching means, such diode characteristics being utilized to effect non-conduction of each switching means prior to conduction of the other switching means to minimize simultaneous switching means conduction and hence circuit power dissipation.

6 Claims, 2 Drawing Figures

HIGH-POWER, HIGH FREQUENCY SATURABLE CORE MULTIVIBRATOR POWER SUPPLY

BACKGROUND OF THE INVENTION

1. Field of the Invention

The present invention relates in general to power supply circuits, and, more particularly, to a novel saturable core astable multivibrator power supply circuit operable to provide a high-power, high-frequency voltage output.

2. Description of the Prior Art

A power supply circuit particularly suitable for providing illuminating excitation to large descriptor area gaseous discharge cells in an A.C. plasma display panel, in conjunction with an A.C. plasma display driver circuit such as that disclosed in my copending application for U.S. Pat. filed on July 22, 1974 under Ser. No. 490,350, must provide a high-power, high-frequency square wave voltage output. A typical large descriptor area cell, being well over one inch in length and one-half inch in width, requires square wave excitation current on the order of 250 milliamperes at a 230 volt peak-to-peak level, the current preferably alternating at a high frequency of approximately 150 to 200 kilohertz to achieve sufficient cell brightness.

Saturable core astable multivibrator power supply circuits have been provided to efficiently invert D.C. input voltages to produce square wave voltage outputs having relatively low frequencies typically on the order of 15 kilohertz, approximately one-tenth the minimum satisfactory frequency of that voltage required for illumination of large descriptor area gaseous discharge cells. A typical saturable core astable multivibrator or inverter circuit comprises two transistor switching means alternately and regeneratively driven into cutoff and saturation conditions.

Unsuccessful attempts have been made to modify prior known saturable core astable multivibrator circuits to provide high-power outputs at frequencies much higher than relatively low and efficient circuit operating frequencies, such modifications including use of high-power transistor switching means, use of separate output driver and saturable core feedback transformer means, and increasing and operating frequencies or speeds of circuit components. As those familiar with transistor switching devices will readily appreciate, high-power transistor means have significant parasitic junction or depletion layer capacitances, which drastically reduce transistor means switching speeds. Such modified circuits have proven to be unsatisfactory due to intolerable high circuit power dissipation resulting from repetitive simultaneous conduction of both transistor means during their switching transitions, such simultaneous conduction being due to slow transistor means switching speeds caused by such parasitic junction capacitances. This undesirable effect is not appreciable in circuits operating at relatively low frequencies, since instantaneous transistor means power dissipation in such circuits is integrated over relatively long time periods, thereby resulting in acceptable low average power dissipation. Thus, prior known saturable core astable multivibrator circuits have not heretofore been successfully provided for supplying high-power, high-frequency square wave outputs.

SUMMARY OF THE INVENTION

The present invention comprises a simple and inexpensive solution to the above problem, and comprises a saturable core astable multivibrator power supply circuit operable to provide a high-power, high-frequency square wave output particularly suitable for, but not limited to, providing illuminating excitation to large descriptor area gaseous discharge cells in a plasma display panel. Although the novel power supply circuit of the present invention comprises two alternately conducting high-power semiconductor switching means having significant speed-limiting parasitic junction capacitances, the present invention minimizes simultaneous switching means conduction and resulting circuit power dissipation by effecting non-conduction of each switching means prior to conduction of the other switching means, by utilizing both the slow forward and slow reverse recovery time characteristics of a slow recovery diode means associated with, and connected to, each switching means.

More specifically, each slow recovery diode means is operable, when forwardly biased, to clamp its associated switching means reversely biased, and also to provide a current path to forwardly bias its non-associated switching means. Each diode means has slow reverse recovery time characteristics, whereby, upon reversal of feedback voltage at the output of a saturable core feedback transformer means to provide reverse bias on that diode means and forward bias on its associated switching means, residual stored charge on that diode means during its reverse recovery time momentarily maintains reverse bias on its associated switching means, and also provides reverse current for discharging junction capacitance of its non-associated switching means to render the latter non-conductive. Furthermore, each diode means has slow forward recovery time characteristics, whereby, upon reversal of the feedback voltage to forward bias that diode means, initial voltage overshoot developed across that diode means during its forward recovery time beyond its steady state forward bias voltage heavily reversely biases its associated switching means to rapidly render the latter non-conductive. Thus, both slow recovery diode means cooperatively effect non-conduction of each switching means prior to conduction of the other switching means to minimize simultaneous switching means conduction and hence circuit power dissipation.

Since an illuminated large descriptor area plasma display cell requires a repetitive high-current supply at a constant voltage level to avoid undesirable false or spurious cell illumination during half-select conditions, the present invention further includes novel regulating means whereby the D.C. input voltage level to the power supply circuit is regulated in accordance with the maximum value of its unidirectional voltage output.

DESCRIPTION OF THE PREFERRED EMBODIMENT

Figure 1:
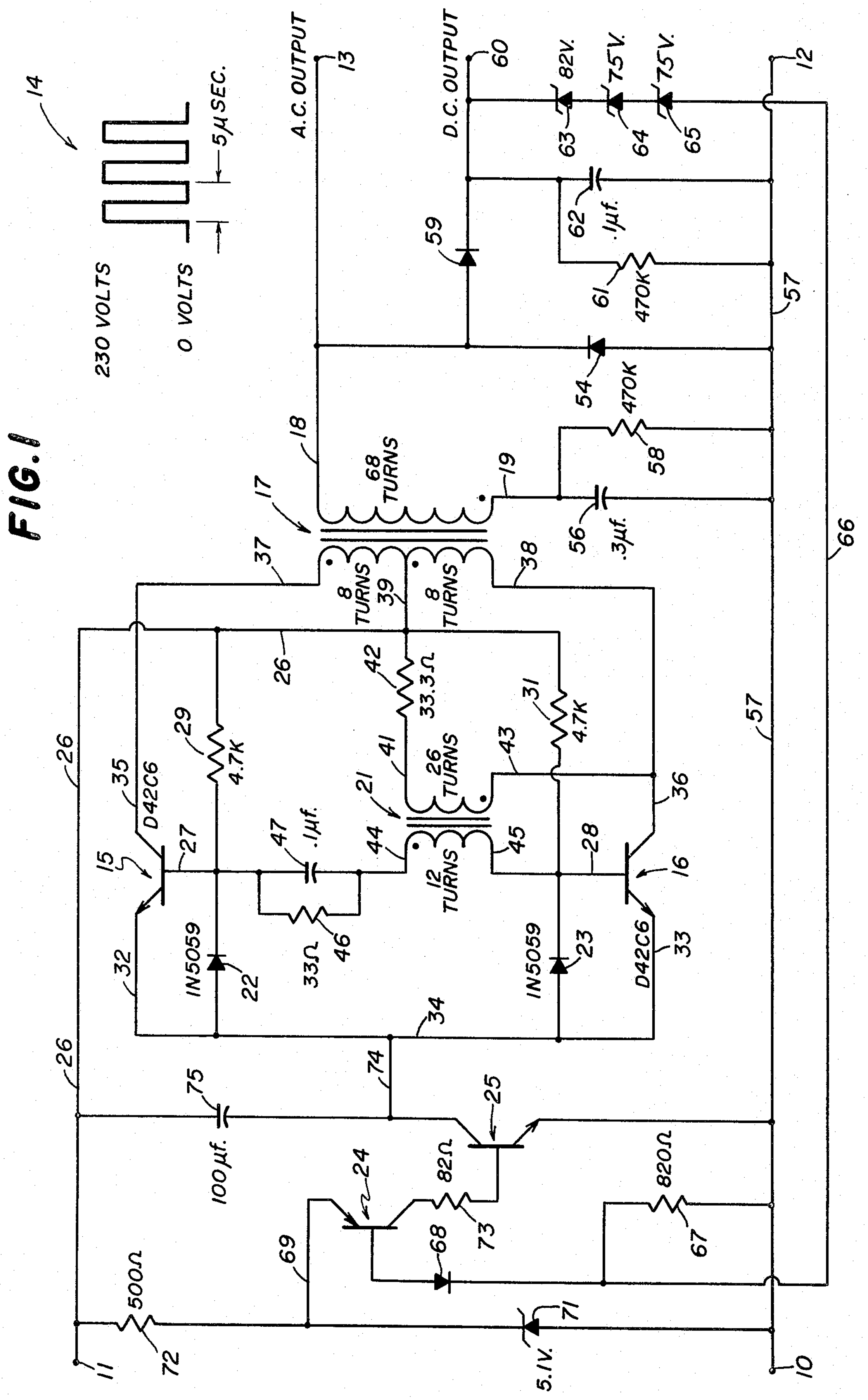
FIG. 1 is a schematic diagram illustrating the basic features of the preferred embodiment of the high-power, high-frequency multivibrator power supply circuit of the present invention.

The preferred embodiment of the present invention comprises a saturable core astable multivibrator power supply circuit schematically illustrated in FIG. 1. In general, a D.C source voltage, on the order of 15 to 18 volts, is provided across a reference terminal 10 and a power input terminal 11 by known D.C. power supply means (not shown). The illustrated circuit is operable to provide a regulated unidirectional high-power, high-frequency square wave output across an output reference terminal 12 and an A.C. output terminal 13, the output being approximately 230 volts peak-to-peak and at a frequency of approximately 150 to 200 kilohertz, with a resultant period of approximatley 5 microseconds, as pictorially illustrated in the upper right-hand corner of FIG. 1 and generally designated by reference numeral 14.

The astable multivibrator power supply comprises a dual-transformer circuit including two high-power transistor means or other suitable switching means 15, 16 connected in preferred common emitter circuit configuration and to the D.C. power source across terminals 10, 11. Transistor means 15, 16 are further connected to a non-saturating driver transformer means 17 and are alternately conductive to induce a high-frequency square wave voltage across opposite secondary output terminals or leads 18, 19 of driver transformer means 17.

The power supply circuit comprises a high-permeability low-volume toroidal saturable core feedback transformer means, generally indicated by reference numeral 21, having a core material with a hysteresis curve approximating a square loop. Feedback transformer means 21 is connected to driver transformer means 17 and to transistor means 15, 16 for providing periodically reversing feedback voltage to regeneratively control alternate switching means conduction in a known manner. The circuit further includes slow recovery clamping diode means 22, 23 connected across the base-emitter junction of transistor means 15, 16, respectively, to cooperatively effect non-conduction of each transistor means prior to conduction of the other transistor means in a manner to be described, in order to minimize simultaneous transistor means conduction and resulting circuit power dissipation. The circuit further comprises regulating means including a comparison transistor means 24 operable to provide a variable control current to a series regulating transistor means 25, whereby the level of the D.C. input voltage supplied to the multivibrator is regulated in acccordance with the maximum value of its output.

It will be recognized that the voltages and component types and values illustrated and disclosed here are preferably utilized to practice the present invention. However, other suitable voltage values and components may be substituted for those illustrated, their selection being a matter of design choice.

Turning specifically to the details of the power supply circuit as illustrated in FIG. 1, power input terminal 11 is connected through a power input lead 26 to the base terminals 27, 28 of transistor means 15, 16 through starting resistors 29, 31, respectively. Associated emitter leads 32, 33 of transistor means 15, 16, respectively, are commonly interconnected to a lead 34. The anode and cathode terminals of slow recovery diode means 22 are connected to emitter lead 32 and base lead 27, respectively, of transistor means 15. Similarly, the anode and cathode terminals of slow recovery diode means 23 are connected to emitter lead 33 and base lead 28, respectively, of transistor means 16. A collector lead 35 of transistor means 15, and a collector lead 36 of transistor means 16, are respectively connected to primary input terminals 37, 38 of driver transformer means 17, this transformer means having a mid-point lead 39 connected to power input lead 26 and to a primary input terminal 41 of saturable core feedback transformer means 21 through a feedback resistor 42, the other primary input terminal 43 of feedback transformer 21 being connected to collector lead 36. Feedback transformer 21 provides periodically reversing feedback voltage at secondary terminals 44, 45 thereof connected to base terminal 27 of transistor means 15 through a resistor 46 and a parallel capacitor 47, and to base lead 28 of transistor means 16, respectively.

Upon application of D.C voltage across terminals 10 and 11, a D.C. voltage will appear across leads 26 and 34, in a manner to be described, in order to initiate circuit operation, a slight forward bias being applied to both transistor means 15, 16 through starting resistors 29, 31, with the result that one of the transistor means will become conductive and assume a saturation condition, while the other transistor switching means will become non-conductive and assume a cutoff condition. The saturated one of the transistor means 15, 16 causes current to flow in one portion of the primary winding of driver transformer means 17 to induce voltages of equal magnitude between mid-point lead 39 and each of leads 37 and 38, resulting in an induced high voltage in accordance with the driver transformer means turns ratio at secondary output terminals 18, 19, voltage polarities being determined in accordance with conventional dot polarity markings in FIG. 1. Current in the primary winding of driver transformer 17 causes a magnetizing current to flow in the primary winding of saturable core feedback transformer means 21 through current-limiting feedback resistor 42 to induce feedback voltage across secondary terminals 44, 45 until core saturation, at which time rapidly increasing magnetizing current caused by diminished core inductance produces a relatively large voltage drop across the feedback resistor, thereby resulting in reversal of feedback voltage across secondary terminals 44, 45 to effect reversal of the saturation and cutoff conditions of transistor means 15, 16 in a known manner, the frequency of the voltage output of driver transformer means 17 being determined in accordance with the hysteresis characteristics of feedback transformer means 21.

It will be appreciated that transistor means 15, 16, which are high-power switching devices, have significant parasitic junction capacitances, also frequently identified as barrier or depletion layer capacitances, which severely decrease the turn-on and turn-off or switching speeds of the transistor means. For example, each transistor means 15, 16 has turn-on and rise time characteristics on the order of 100 nanoseconds, while storage time thereof is approximately 500 nanoseconds. Simultaneous conduction of transistor means 15, 16 during each switching interval, when one transistor means is becoming conductive or turning-on while the other transistor means is becoming non-conductive or turning-off, results in undesirable circuit power dissipation. Since charged collector-base junction capacitance of a turning-off transistor means 15, 16 limits the turn-off speed thereof, a simultaneous conducting turning-on transistor means presents a low impedance path to the turning-off transistor means and attempts to drive or render the turning-off transistor means non-conductive at an abnormal reduced turn-off speed in a known manner, thereby resulting in increased turning-off transistor means power, a portion of which represents wasted power dissipation. Therefore, it is important to render a turning-off transistor means non-conductive prior to conduction of the other transistor means, by increasing the turn-off speed of the turning-off transistor means, and delaying the turn-on of the non-conductive transistor means until the turning off transistor means is non-conductive.

Considering slow recovery clamping diode means 22 as being typical of both diode means 22, 23, this diode means is operable, when forwardly biased in response to a positive feedback voltage on secondary lead 45 with respect to lead 44 of feedback transformer means 21, to clamp the base-emitter junction of its associated transistor means 15 reversely biased by maintaining the emitter lead 32 approximately –0.7 volts with respect to base lead 27. Furthermore, typical diode means 22 is operable, when forwardly biased, to provide a current path to forwardly bias the base-emitter junction of its non-associated transistor means 16, bias current being effected by the driving feedback voltage across secondary terminals 44, 45 with the current path comprising base lead 28 and emitter lead 33 of transistor means 16, lead 34, diode means 22 and current-limiting resistor 46, capacitor 47 being charged to later provide a voltage source to rapidly render non-conductive transistor means 15 conductive when the feedback voltage reverses. Diode means 23 is operable in an identical manner to clamp its associated transistor means 16 reversely biased and to provide a current path to forwardly bias its non-associated transistor or switching means 15 when diode means 23 is forwardly biased in response to positive feedback voltage on secondary lead 44 with respect to lead 45. Of course, when the base-emitter junction of one of transistor means 15, 16 is forwardly biased, its associated one of the diode means 22, 23 is reversely biased and hence non-conductive.

Figure 2:
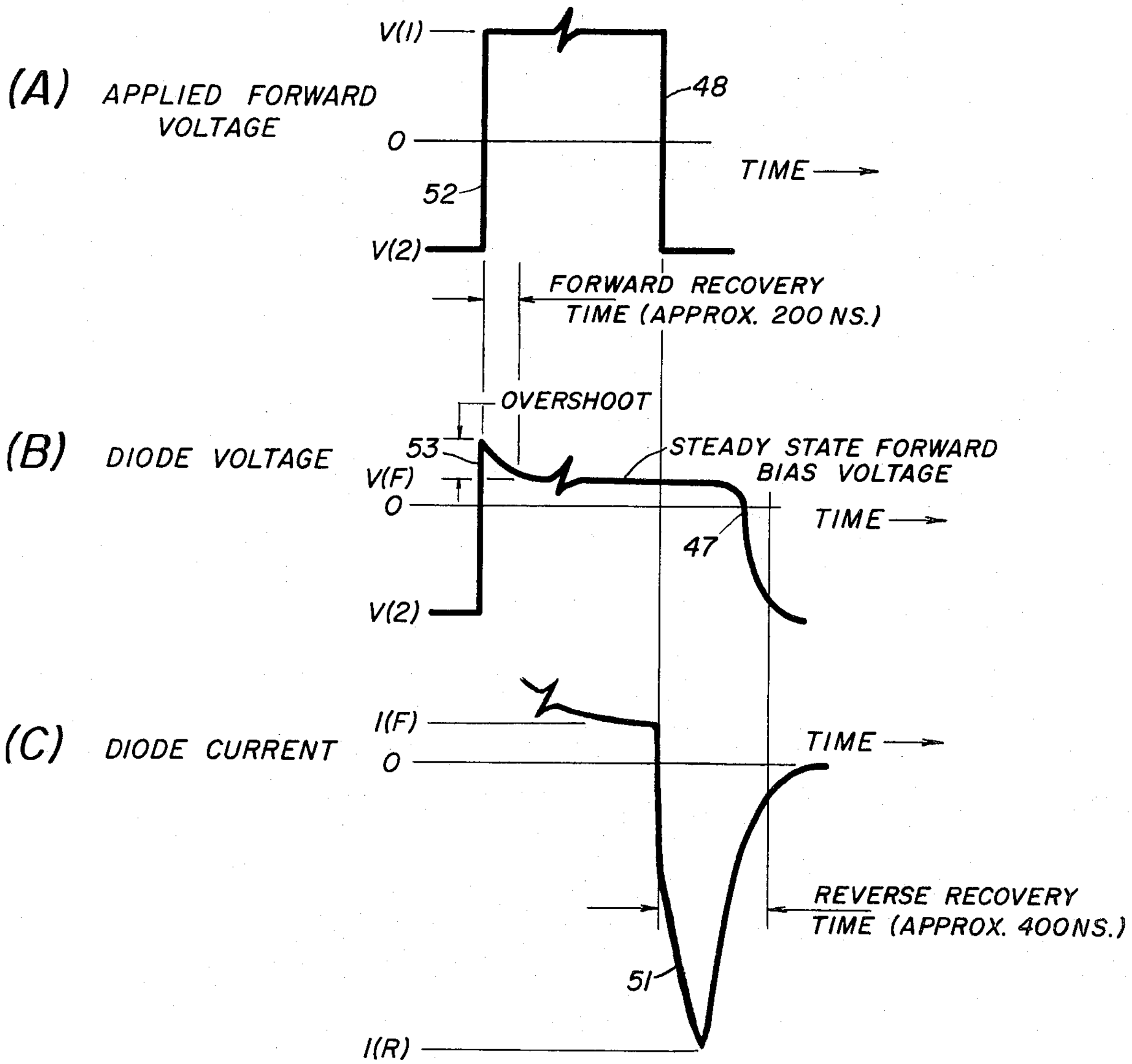
FIG. 2 is an idealized graphical representation illustrating slow recovery time characteristics of diode means utilized in the circuit shown in FIG. 1.

Each slow recovery diode means 22, 23, which preferably comprises a JEDEC No. 1N5059 device, has slow reverse recovery time characteristics, such that when forwardly biased and thereafter subjected to a reverse voltage, a large reverse current will flow for a short time interval, called its reverse recovery time, as a result of the stored charge consisting of minority carriers on both sides of the diode junction, as illustrated in FIG. 2, which is an idealized graphical representation of the slow forward and reverse recovery time characteristics of the diode means. FIG. 2(A) illustrates the applied forward voltage on one of the slow recovery diode means 22, 23 with respect to time. Upon application of a positive forward voltage V(1), the diode means voltage will assume its steady state forward bias value of approximately 0.7 volts designated V(F) in FIG. 2(B), and a forward diode current designated I(F) in FIG. 2(C) results. Upon a transition, designated by reference numeral 48 in FIG. 2(A), from positive applied forward voltage V(1) to a negative forward or reverse voltage V(2), the diode means voltage does not decrease instantaneously. Rather, due to stored charge, diode means voltage momentarily remains relatively constant, and then rapidly decreases to approach the value of the applied reverse voltage V(2), during the diode means reverse recovery time, as illustrated by reference numeral 47 in FIG. 2(B), the actual reverse recovery time being approximately 400 nanoseconds in the preferred circuit having the illustrated component values. During the reverse recovery time, a large reverse current designated by reference numeral 51 in FIG. 2(C) and having a maximum reverse value I(R) results, the maximum reverse current I(R) having a magnitude of approximately 800 milliamperes in the illustrated circuit, which is much larger than forward diode means current I(F) of approximately 100 milliamperes just prior to the instant of switching. Of course, the relative magnitudes of the forward and reverse diode means currents depend upon the circuit components, and the actual circuit waveforms will differ from the ideal representations shown in FIG. 2.

The slow reverse recovery time characteristics of each of the diode means 22, 23 is utilized in the circuit illustrated in FIG. 1, described with particular reference to typical diode means 22. Upon reversal of feedback voltage on the secondary winding of feedback transformer means 21 to provide reverse bias on diode means 22 and forward bias on the base-emitter junction of its associated transistor means 15, that is, when voltage on secondary terminal 44 is positive with respect to terminal 45, residual stored charge on diode means 22 during its reverse recovery time momentarily maintains reverse bias on the base-emitter junction of transistor means 15 to maintain that transistor means non-conductive until transistor means 16 becomes non-conductive. Immediately after the stored charge on diode means 22 is depleted, feedback voltage rapidly drives transistor means 15 conductive, its fast turn-on time being unaffected further by diode means 22. Furthermore, stored charge on diode means 22 provides reverse current over conductor 34 for discharging the base-emitter junction capacitance of transistor means 16 to render that transistor means non-conductive, its base-emitter junction capacitance being previously charged by forward bias on that junction. Diode means 23 is identically operable to momentarily delay conduction of transistor means 16 and to discharge base-emitter junction capacitance of transistor means 15.

Each slow recovery diode means 22, 23 has slow forward recovery time characteristics, such that, upon sudden application of a large forward current thereto, diode means voltage will rise above or overshoot its steady state forward bias voltage and then drop rapidly, approaching its steady state value in approximately an exponential manner, due to the finite time required to establish minority carrier density on both sides of the diode junction. With reference to FIG. 2(A), a transition illustrated by reference numeral 52 from reverse applied diode voltage V(2) to forward applied voltage V(1) effects an initial voltage overshoot, designated by reference numeral 53 in FIG. 2(B), and having a magnitude of approximately 0.4 volt during a forward recovery time of approximately 200 nanoseconds in the illustrated circuit.

With reference to FIG. 1, taking diode means 23 as typical, upon reversal of feedback voltage on the secondary of the feedback transformer means 21, that is, when terminal 44 is positive with respect to terminal 45, initial voltage overshoot developed across diode means 23 during its forward recovery time beyond its steady state forward bias voltage heavily reversely biases the base-emitter junction of its associated transistor means 16 by increasing the depletion region of that junction to rapidly render transistor means 16 non-conductive. Thereafter, steady state forward bias voltage on diode means 23 clamps the base-emitter junction of transistor means 16 reversely biased to prevent conduction thereof in response to operation of its parasitic collector capacitance when voltage on conductor 36 rapidly rises, that collector capacitance tending to couple positive-going voltage on conductor 36 to base lead 28. Diode means 22 functions in an identical manner.

As a result of the slow recovery diode means 22, 23, instantaneous power in transistor means 15, 16 is repetitively experienced only when one of the transistor means is becoming conductive or turning-on, this instantaneous power being essentially reflected load power without wasted circuit power dissipation.

As illustrated in FIG. 1, the power supply circuit of the present invention further comprises a high-speed diode means 54 and a capacitor 56 connected from opposite secondary output terminals 18, 19, respectively, of driver transformer means 17, to a common lead 57 connected to input reference terminal 10 and to output reference terminal 12, a bleeder resistor 58 being connected in parallel with this capacitor. The square wave voltage output at terminals 12, 13 is derived across diode means 54, which is alternately forwardly and reversely biased in accordance with the polartiy of the voltage induced at secondary output terminals 18, 19. Whenever terminal 19 becomes positive with respect to terminal 18, capacitor 56 is charged through conducting diode means 54. Whenever terminal 18 is positive with respect to terminal 19, diode means 54 is non-conductive, and voltage across capacitor 56 is additive to the voltage across terminals 18, 19, thereby providing a voltage across terminals 12, 13 which is twice the magnitude of the voltage induced in the secondary winding of driver transformer means 17. Thus, a unidirectional or unipolar square wave voltage is derived across diode means 54, unidirectional voltage being preferred for use with an A.C. plasma display driver circuit such as that described in my previously mentioned copending application.

In order to regulate the level of the D.C. input voltage to leads 26 and 34 connected to the multivibrator portion of the circuit, the present invention comprises voltage sensing means for deriving a D.C. voltage substantially equal to the maximum value of the unidirectional output voltage available across terminals 12 and 13. This voltage sensing means comprises rectifying means including a rectifying diode means 59 connected to the A.C. output voltage terminal 13 and to a high-voltage D.C. output terminal 60, and a filter comprising a resistor 61 and a capacitor 62 connected from the output of diode means 59 to reference line 57. The sensing means further includes three series-connected conventional Zener diodes 63, 64 and 65 connected to a lead 66 for providing a low D.C. voltage thereon representative of the maximum value of the D.C. output voltage on terminal 60 and hence the maximum value of the unidirectional square wave voltage on output lead 13 with respect to reference terminal 12.

Lead 66 is connected to reference lead 57 through a resistor 67, and to the base of Comparison transistor means 24 through a diode means 68. Comparison transistor means 24 comprises a PNP type transistor having an emitter terminal or lead 69 connected to a reference voltage established by a Zener diode means 71 connected to reference terminal 10, and a series resistor 72 connected to power input terminal 11. Regulating transistor means 25 comprises an NPN type transistor having a base terminal connected to the collector of comparison transistor means 24 through a resistor 73, an emitter connected directly to reference lead 57, and a collector connected to lead 34 through a lead 74, and also to input lead 26 through a capacitor 75.

Comparison transistor means 24 is conductive in its active operating region to provide a variable control current through resistor 73 inversely responsive to the D.C. voltage on lead 66 when this voltage decreases below a predetermined level of approximately 3.7 volts, representing the difference between the 5.1 volt reference level established on lead 69 and the approximate 0.7 volt drop across forwardly biased diode means 68 and a similar voltage drop across the base-emitter junction of transistor means 24. When the voltage on lead 66 exceeds 3.7 volts, transistor means 24 becomes non-conductive.

Series regulating transistor means 25 is conductive in its active operating region in response to control current supplied by comparison transistor means 24, transistor means 25 serving to determine the charge on capacitor 75, which is essentially connected in parallel with the multivibrator portion of the power supply circuit. As control current to series regulating transistor means 25 increases, its operating resistance decreases and the voltage level on capacitor 75 rises. However, should the unidirectional voltage output at terminal 13 rise significantly, the previously described voltage sensing means will cause voltage on lead 66 to increase to render comparison transistor means 24 non-conductive, with the result that series regulating transistor means 25 will likewise become non-conductive, thereby causing voltage on capacitor 75 to decrease upon discharge thereof by way of dissipation of its stored energy to supply the multivibrator portion of the circuit through terminals 26, 34, with the result that the output voltage on terminal 13 will be reduced to its proper equilibrium value. The values of resistor 61 and capacitor 62 determine the regulation response time. However, for the indicated component values, the level of D.C. voltage supplied to the multivibrator portion of the circuit at terminals 26, 34 is regulated rapidly in accordance with the maximum value of its unidirectional output voltage.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

The embodiments of the invention in which an exclusive property or privilege is claimed are defined as follows:

1. For use in a saturable core astable multivibrator power supply circuit operable to provide a high-power, high-frequency square wave output, said circuit including two alternately conducting high-power semiconductor switching means having significant parasitic junction capacitances and being in circuit with saturable core feedback transformer means operable to provide periodically reversing feedback voltage to said switching means for controlling alternate conduction thereof, a slow recovery diode means in circuit with each said switching means, each said diode means being operable, when forwardly biased, to clamp its associated said switching means reversely biased and to provide a current path to forwardly bias its non-associated said switching means;

each said diode means having slow reverse recovery time, whereby, upon reversal of said feedback voltage to provide reverse bias on said diode means and forward bias on said associated switching means, residual stored charge on said diode means during said reverse recovery time maintains reverse bias on said associated switching means and provides reverse current for discharging junction capacitance of said non-associated switching means to render the latter non-conductive;

each said diode means having slow forward recovery time, whereby, upon reversal of said feedback voltage to forward bias said diode means, initial voltage overshoot developed across said diode means during said forward recovery time beyond the steady state forward bias voltage thereof heavily reversely biases said associated switching means to render the latter non-conductive;

whereby both said slow recovery diode means cooperatively effect non-conduction of each said switching means prior to conduction of the other said switching means to minimize simultaneous switching means conduction and circuit power dissipation.

2. A saturable core astable multivibrator power supply circuit operable to provide a high-power, high-frequency square wave output, comprising:

two high-power transistor means having significant parasitic junction capacitances, said transistor means being connected in common emitter circuit configuration to a power source and to driver transformer means and being alternately conducting to induce a high-frequency square-wave voltage at the output thereof;

saturable core feedback transformer means being connected to said driver transformer means and to the base terminals of said transistor means to provide periodically reversing feedback voltage to said base terminals to control alternate transistor means conduction;

a slow recovery clamping diode means connected across the base-emitter junction of each said transistor means;

each said diode means being operable, when forwardly biased, to clamp the base-emitter junction of its associated said transistor means reversely biased and to provide a current path to forwardly bias the base emitter junction of its non-associated said transistor means;

each said diode means having slow reverse recovery time, whereby, upon reversal of said feedback voltage to provide reverse bias on said diode means and forward bias on the base-emitter junction of said associated transistor means, residual stored charge on said diode means during said reverse recovery time maintains reverse bias on the latter junction and provides reverse current for discharging base-emitter junction capacitance of said non-associated transistor means to render the latter non-conductive;

each said diode means having slow forward recovery time, whereby, upon reversal of said feedback voltage to forward bias said diode means, initial voltage overshoot developed across said diode means during said forward recovery time beyond the steady state forward bias voltage thereof heavily reversely biases the base-emitter junction of said associated transistor means to render the latter non-conductive;

whereby both said slow recovery diode means cooperatively effect non-conduction of each said transistor means prior to conduction of the other said transistor means to minimize simultaneous transistor means conduction and circuit power dissipation.

3. The power supply circuit of claim 2, a capacitor and high-speed diode means connected from opposite output terminals of said driver transformer means to a common reference terminal, and a bleeder resistor connected in parallel with said capacitor, said high-speed diode means being alternately forwardly and reversely biased, said power supply circuit output being derived across said high-speed diode means, voltage on said capacitor being periodically additive to said driver transformer means output; whereby unidirectional square wave voltage is derived across said high-speed diode means.

4. The power supply circuit of claim 3, a D.C. power source provided across reference and power input terminals, voltage sensing means for deriving a D.C. voltage representative of the maximum value of said unidirectional voltage, comparison transistor means being connected to a reference voltage and to said D.C. voltage and being conductive in its active operating region to provide a variable control current inversely responsive to said D.C. voltage when the latter decreases below a predetermined level, series regulating transistor means connected to said reference terminal, and a capacitor connected in series with said latter transistor means and to said power input terminal, said multivibrator power supply circuit being connected in parallel with said capacitor, said series regulating transistor means being conductive in its active operating region in response to said control current to determine voltage on said capacitor; whereby D.C. voltage supplied to said multivibrator power supply circuit is regulated in accordance with the maximum value of said unidirectional voltage.

5. The power supply circuit of claim 4, wherein said sensing means comprises rectifying means and Zener diode means.

6. The power supply circuit of claim 4, wherein said comparison transistor means comprises a PNP type transistor having an emitter terminal thereof connected to said reference voltage and a base terminal thereof connected to said voltage sensing means, and wherein said regulating transistor means comprises an NPN type transistor having an emitter terminal thereof connected to said reference terminal and a collector terminal thereof connected to said capacitor.

* * * * *